Patented Sept. 24, 1940

2,215,865

UNITED STATES PATENT OFFICE 2,215,865

RECOVERY OF CONCENTRATED ALKYLENE CHLORHYDRINS

Walter Ziese, Mannheim, Germany, assignor, by mesne assignments, to General Aniline & Film Corporation, New York, N. Y., a corporation of Delaware.

No Drawing. Application January 19, 1939, Serial No. 251,703. In Germany May 3, 1937

3 Claims. (Cl. 202—60)

The present invention relates to an improved process for the recovery of concentrated alkylene chlorhydrins from their dilute aqueous solutions.

I have found that concentrated alkylene chlorhydrins can be obtained in good yields from aqueous solutions of alkylene chlorhydrins by mixing the solutions with sodium carbonate or potassium carbonate or both, advantageously until they are saturated, separating the layers formed and if necessary distilling the upper layer.

Suitable alkylene chlorhydrins are for example ethylene chlorhydrin, propylene chlorhydrin, butylene chlorhydrin and mixtures of the said compounds.

An advantage of the process consists in the fact that even dilute alkylene chlorhydrin solutions, as for example from 30 to 40 per cent solutions, may be used. Of the layers formed by saturation with sodium carbonate or potassium carbonate, the upper layer is concentrated alkylene chlorhydrin and contains almost the whole amount of the same present (from 92 to 98 per cent). From the lower layer, consisting of sodium carbonate or potassium carbonate solution, the sodium carbonate or potassium carbonate may be recovered in a dehydrated form, for example on a roll dryer.

If from 30 to 40 per cent solutions of alkylene chlorhydrins and sodium carbonate are used, the upper layer consists of an aqueous alkylene chlorhydrin solution of 70 to 80 per cent strength. It is separated and can be used as such or further enriched in a suitable manner, for example by azeotropic distillation preferably after previous neutralization of the sodium carbonate or potassium carbonate dissolved in the said upper layer with gaseous hydrochloric acid. The further enrichment may be, however, also carried out with advantage with potassium carbonate only, for example by adding potassium carbonate in an amount of from 20 to 25 per cent, whereby two layers are formed once more, the upper of which consists of almost pure alkylene chlorhydrin. The pure alkylene chlorhydrin may be obtained therefrom by a simple distillation.

The following examples will further illustrate how the said invention may be carried out in practice, but the invention is not restricted to these examples.

Example 1

2 kilograms of sodium carbonate are added to 10 liters of an ethylene chlorhydrin solution containing 3.2 kilograms of ethylene chlorhydrin; after thorough mixing, 2 layers form upon standing. The upper layer (3.5 liters) has a specific gravity of 1.15. It is separated and mixed with 0.85 kilogram of potash. After the latter has dissolved, the upper layer formed is again separated. It has a specific gravity of 1.19 and consists of 3.35 kilograms of 85 per cent ethylene chlorhydrin. A single distillation with the aid of a fractionating column yields 2.05 kilograms of anhydrous ethylene chlorhydrin and 0.8 kilogram of a 86.5 per cent solution thereof, i. e. about 87 per cent of the theoretical yield.

Example 2

10 liters of an aqueous solution of ethylene chlorhydrin containing 3.2 kilograms of ethylene chlorhydrin are mixed with 7 kilograms of potassium carbonate. After the potassium carbonate has dissolved, two layers are formed. The upper layer is separated and yields after a single distillation 3.33 kilograms of an 84 per cent solution of pure ethylene chlorhydrin. The solution of potassium carbonate may be dehydrated and used again.

Example 3

50 liters of an aqueous ethylene chlorhydrin solution containing 20 kilograms of

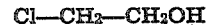
$$Cl-CH_2-CH_2OH$$

are mixed at 20° C. while stirring with 12.5 kilograms of sodium carbonate. When the sodium carbonate has dissolved, the stirring is discontinued and separation into layers is allowed to take place. The upper layer, consisting of about 22 kilograms of 83 per cent ethylene chlorhydrin, is withdrawn and distilled. A first runnings of about 12 kilograms of 69 per cent ethylene chlorhydrin and a fraction of about 10 kilograms of 100 per cent ethylene chlorhydrin are thus obtained. The first runnings are mixed with dilute ethylene chlorhydrin in such a manner that a solution of the original concentration is formed which is then treated in the above-mentioned manner. The sodium carbonate may either be worked up to crystalline soda or used in the form of its solution for any purpose, as for example for the preparation of salts.

Example 4

2.76 kilograms of sodium carbonate are added within half an hour to 10 liters of an aqueous solution of propylene chlorhydrin containing 2.87 kilograms of propylene chlorhydrin at 20° C. while stirring. The temperature rises thereby to about 32° C. After the addition of the sodium carbonate has been finished, stirring is continued for a short time and then separation into two layers is allowed to take place. The upper layer consisting of 3 liters of an aqueous solution containing 91.5 per cent by volume of propylene chlorhydrin is withdrawn. The yield is 2.75 kilograms of propylene chlorhydrin, i. e. 96 per cent of the calculated yield. After distillation of the said propylene chlorhydrin solution with the aid of a fractionating column there are obtained first runnings consisting of 0.86 kilogram of a solution of propylene chlorhydrin of 71 per cent by volume and a fraction of 1.85 kilograms of pure propylene chlorhydrin. The first runnings may be mixed with diluted propylene chlorhydrin and treated again with sodium carbonate.

What I claim is:

1. A process for recovering concentrated alkylene chlorhydrin which comprises saturating dilute aqueous solutions of an alkylene chlorhydrin containing up to 4 carbon atoms with an alkali carbonate selected from the class consisting of sodium carbonate and potassium carbonate, separating the two layers formed thereby and distilling the upper layer.

2. A process for recovering concentrated ethylene chlorhydrin which comprises substantially saturating dilute aqueous solutions of ethylene chlorhydrin with sodium carbonate, separating the two layers formed thereby and distilling the upper layer.

3. A process for recovering concentrated ethylene chlorhydrin which comprises substantially saturating a 40 per cent aqueous solution of ethylene chlorhydrin with sodium carbonate, separating the two layers formed thereby and distilling the upper layer.

WALTER ZIESE.